United States Patent [19]

Harada et al.

[11] Patent Number: 5,167,856

[45] Date of Patent: Dec. 1, 1992

[54] IONOPHORE-CONTAINING FERROELECTRIC LIQUID CRYSTAL MIXTURES

[75] Inventors: Takamasa Harada, Inzai, Japan; Norbert Rösch, Frankfurt am Main; Rainer Wingen, Hattersheim am Main, both of Fed. Rep. of Germany

[73] Assignee: Hoechst Aktiengesellschaft, Frankfurt am Main, Fed. Rep. of Germany

[21] Appl. No.: 683,305

[22] Filed: Apr. 10, 1991

[30] Foreign Application Priority Data

Apr. 12, 1990 [DE] Fed. Rep. of Germany ....... 4011792

[51] Int. Cl.$^5$ ............ C09K 19/52; C09K 19/06; C09K 19/58; C09K 19/54
[52] U.S. Cl. ............ 252/299.01; 252/299.6; 252/299.5; 252/299.2
[58] Field of Search ............ 252/299.01, 299.63, 252/299.2, 299.6, 299.66, 299.5

[56] References Cited

U.S. PATENT DOCUMENTS 4,966,726 10/1990 Scherowsky et al. ............ 252/299.6

FOREIGN PATENT DOCUMENTS 0385688 9/1990 European Pat. Off. .

OTHER PUBLICATIONS

F. Voegtle et al., Chemische Berichte, vol. 116, No. 5, 1983, pp. 2028-2034.

*Primary Examiner*—Robert L. Stoll
*Assistant Examiner*—C. Harris
*Attorney, Agent, or Firm*—Curtis, Morris & Safford

[57] ABSTRACT

The occurrence of twist states in FLC displays can be suppressed by adding ionophores to FLC mixtures. Applicable ionophores are amides of the general formula I

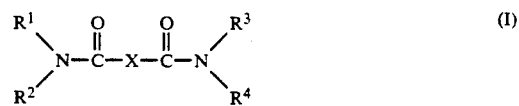

wherein $R^1$, $R^2$, $R^3$ and $R^4$ e.g. are alkyl, cyclohexyl, phenyl or benzyl and X is alkylene with —$CH_2$-groups being replaced by —O—, 1,2-phenylene or 1,2-cyclohexylene.

10 Claims, No Drawings

IONOPHORE-CONTAINING FERROELECTRIC LIQUID CRYSTAL MIXTURES

The invention relates to the use of ionophores in ferroelectric liquid crystal mixtures and the use of these mixtures in electrooptical switching and display elements.

Switching and display elements which contain ferroelectric liquid crystal mixtures ("FLC light valves") are known, for example, from EP-B 0,032,362 (=U.S. Pat. No. -A 4,367,924). Liquid crystal light valves are devices which change their optical transmission properties, for example because of electrical switching, in such a manner that transmitted (and, if appropriate, again reflected) light is intensity-modulated.

Examples are the known wristwatch and pocket calculator displays or liquid crystal displays in the areas of OA (office automation) or TV (television). However, they also include optical shutters, so-called "light shutters", such as are used, for example, in copying machines, printers, welding goggles, polarized spectacles for three-dimensional viewing and the like. So-called "spatial light modulators" are also included in the application range of liquid-crystalline light valves (see Liquid Crystal Device Handbook, Nikkan Kogyo Shimbun, Tokyo, 1989; ISBN 4-526-02590-9C 3054 and articles quoted therein).

The structure of electrooptical switching and display elements is such that the FLC layer is enclosed on both sides by layers which conventionally contain, in the following order starting from the FLC layer, at least one electrically insulating layer, electrodes and an outer sheet (for example made of glass). Moreover they contain a polarizer, if they are operated in the "guest-host" or in the reflective mode, or two polarizers, if the birefringence mode is utilized.

Orientation layers together with a sufficiently small spacing of the outer sheets make the FLC molecules of the FLC mixture adopt a configuration in which the molecules are parallel to one another with respect to their longitudinal axes and the smectic planes are arranged perpendicular or inclined to the orientation layer. In this arrangement, the molecules, as is known, have two equivalent orientations between which they can be switched by applying a pulsed electric field, i.e. FLC displays are capable of bistable switching. The switching times are inversely proportional to the spontaneous polarization of the FLC mixture and are in the range of $\mu$s.

The main advantage of this type of FLC displays compared with the LC displays which are still being used to a large extent in industrial practice is considered to be the attainable multiplex ratio, i.e. the maximum number of the lines addressable in the time-sequential process ("multiplex process"), which is substantially greater in FLC displays than in conventional LC displays. This electrical addressing is essentially based on the above-mentioned pulse addressing which has been described by way of example in SID 85 DIGEST p. 131 (1985).

However, a significant disadvantage of FLC displays is that in the non-addressed state (in most cases) they display an undesirable non-uniformity of the director (i.e. the preferred direction of the molecule), and, therefore, one or more so-called twist states (M.A. Handschy, N.A. Clark, S.T. Lagerwall; Phys. Rev. Lett. 51, 471 (1983) M. Glogarova, J. Pavel; J. Phys. (France) 45, 143 (1984) N. Higi, T. Ouchi, H. Takezoe, A. Fukuda; Jap. J. Appl. Phys. 27, 8 (1988)).

In the memory state and in the multiplex operation, this non-uniformity leads to a strong decline in the contrast in the display, in particular due to the fact that the opaque state becomes considerably lighter (gray dark state). Moreover, the appearance of the twist state is linked to a wavelength dispersion which can lead to distorted colors in the display.

The attempt has already been made to suppress the appearance of the interfering twist states by means of a suitable choice of orientation layers, which, however, has so far only achieved moderate success. Very often, the almost uniform states which sometimes occur (e.g. if SiO vapor deposition at an angle is used) turned out to be unstable and decomposed again into twist states.

The occurrence of twist states seems to be favored in particular if ferroelectric liquid crystal mixtures having high spontaneous polarization are used (M.A. Handschy and N.A. Clark; Ferrolectrics 59, 69 (1984)). However, such mixtures are particularly suitable, especially for the development of highly informative displays, because they result in short switching times.

The object of the present invention is to provide FLC mixtures which, in FLC displays, do not form twist states but lead to uniform states and thus to a high contrast.

Surprisingly, it has now been found that the occurrence of the twist states described above can be suppressed by adding specific ionophores to FLC mixtures.

In DE-A 3,939,697, the use of cryptands and coronands in liquid crystal mixtures for suppressing so-called ghost images has already been presented. In contrast, the ionophores used here—commercial products, for example for ion-selective electrodes; for the definition of this concept, see, for example O.A. Neumüller (ed.) Römpps Chemie-Lexikon, 8th edition, Franckh'sche Verlagshandlung, Stuttgart 1985 —suppress the occurrence of twist states, independent of the orientation layer used in each case.

Accordingly, the object is achieved by providing a liquid crystal mixture composed of at least two components, which contains as one component at least one amide of the general formula (I), which acts as the ionophore

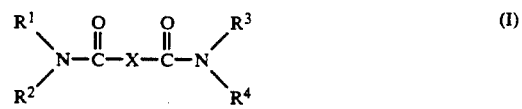

in which $R^1, R^2, R^3, R^4$, independently of one another, are alkyl of 1 to 15 carbon atoms, in which one —CH$_2$— group can be replaced by —COO—, or —CO— or one —CH$_2$— not adjacent to the N-atom by —O—, cyclohexyl, phenyl or benzyl, and X is an alkylene of 2 to 9 carbon atoms, in which one or two non-adjacent —CH$_2$— groups can be replaced by —O—, in which two adjacent CH$_2$ groups can be replaced by 1,2-phenylene or 1,2-cyclohexylene, in which two adjacent —CH$_2$— groups can be replaced by CH(CH$_3$)—CH(CH$_3$)— and in which a hydrogen atom of a CH$_2$ group can be substituted by $R^5$ or $R^6$, in which $R^5$ is alkyl of 1 to 15 carbon atoms, $R^6$ is alkyl of 1 to 15 carbon atoms or $CH_2-O-CH_2-CO-NR^1R^2$.

Preferably, a ferrolectric liquid crystal mixture is used which contains at least one amide of the formula (I) in which $R^1,R^2,R^3,R^4$, independently of one another, are alkyl of 1 to 15 carbon atoms, in which a $-CH_2-$ group can be replaced by $-COO-$, or one $-CH_2-$ not adjacent to the N-atom by $-O-$, cyclohexyl or phenyl, and X is an alkylene of 2 to 9 carbon atoms, in which one or two non-adjacent $-CH_2-$ groups can be replaced by $-O-$, in which two adjacent $CH_2$ groups can be replaced by 1,2-phenylene or 1,2-cyclohexylene, in which two adjacent $-CH_2-$ groups can be replaced by $-CH(CH_3)-CH(CH_3)-$ and in which a hydrogen atom of a $CH_2$ group can be substituted by $R^5$ or $R^6$, in which $R^5$, $R^6$, independently of one another, are alkyl of 1 to 15 carbon atoms.

Amides of the formula (I) in which $R^1,R^2,R^3,R^4$, independently of one another, are alkyl of 1 to 15 carbon atoms, in which one $-CH_2-$ group can be replaced by $-COO-$, or cyclohexyl, and X is an alkylene of 2 to 9 carbon atoms, in which one or two non-adjacent $-CH_2-$ groups can be replaced by $-O-$, in which two adjacent $CH_2$ groups can be replaced y 1,2-phenylene, and in which two adjacent $-CH_2-$ groups can be replaced by $-CH(CH_3)-CH(CH_3)-$, are particularly preferred.

Amides of the formula (I) in which $-X-$ represents one of the following groups

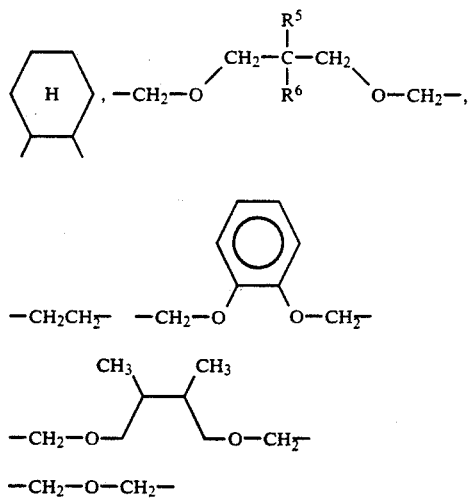

in which $R^1$ to $R^6$ have the abovementioned meanings are also particularly preferred.

It is very particularly preferred for $-X-$ to represent the following groups

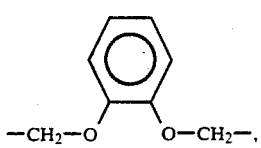

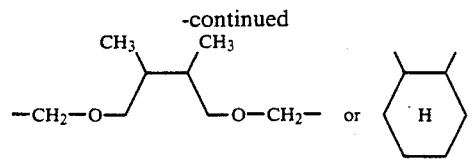

In principle, a wide range of ionophores is suitable for the use in liquid crystal mixtures, but amides of the formula (I) just described are particularly suitable for suppressing twist states.

The FLC mixtures according to the invention preferably contain 0.01 to 10 mol %, in particular 0.1 to 10 mol %, of the compounds of the general formula (I).

As a rule, the liquid crystal mixtures comprise 2 to 20, preferably 2 to 15, components, of which at least one is an ionophore (amide) of the formula (I). The other components are preferably selected from the known compounds having nematic, cholesteric and/or tilted/smectic phases, which include, for example, Schiff's bases, biphenyls, terphenyls, phenylcyclohexanes, cyclohexylbiphenyls, pyrimidines, cinnamic esters, cholesteric esters, various bridged polynuclear esters of p-alkylbenzoic acids having polar end groups. In general, the commercially available liquid crystal mixtures are present as mixtures of a wide range of components even before the compound(s) according to the invention is(are) added, at least one of which components being mesogenic, i.e. a compound which as a derivative or in a mixture with certain cocomponents shows a liquid crystal phase [i.e. is expected to form at least one enantiotropic (clearing temperature > meltingtemperature) or monotropic (clearing temperature < melting temperature) mesophase].

The liquid crystal mixtures described can be advantageously incorporated in electrooptical switching and display devices (FLC light valves or displays). These contain, inter alia, the following components: a liquid-crystalline mixture according to the invention (containing an ionophore), support plates (e.g. made of glass or plastic), coated with transparent electrodes (two electrodes), at least one orientation layer, spacers, adhesive frame, polarizers and for color displays thin color filter films. Further possible components are antireflection, passivation, compensation and barrier coatings and electric non-linear elements, such as, for example, thin-film transistors (TFT) and metal/insulator/metal (MIM) elements. The general structure of liquid crystal displays has already been described in detail in standard monographies (e.g. E. Kaneko, "Liquid Crystal TV Displays: Principles and Applications of Liquid Crystal Displays", KTK Scientific Publishers, 1987, pages 12-30 and 163-172).

Among the FLC light valves, switching devices which can be driven by a multiplex process are preferred. Liquid crystal cells which operate in the SSFLC technique ("surface stabilized ferroelectric liquid crystal") and in which the cell thickness (i.e. spacing of the outer sheets) is 1 to 20 μm are particularly preferred. A cell thickness of 1 to 10 μm, in the birefringence mode in particular of 1.2 to 3 μm, is particularly preferred.

Furthermore, the compounds according to the invention are advantageously used for the operation of a SSFLC display in the so-called "guest-host mode", in which the optical effect is not based on birefringence phenomena but on the anisotropic absorption of dichroic dyes which are dissolved in an FLC matrix.

The compounds according to the invention suppress the occurrence of twist states for various geometries of the smectic layers in the SSFLC cell (see, for example, H.R. Dübal, C. Escher, D. Ohlendorf; Proc. 6th Intl. Symp. on Electrets, Oxford, England (1988)). This is especially true of the so-called "virgin texture" in which the smectic layers are arranged at an angle ("chevron" geometry) and of the "bookshelf" or "quasi-bookshelf" geometry in which the smectic layers are arranged perpendicular to the glass plates (see Y. Sato et al., Jap. J. Appl. Phys. 28, 483 (1989)). The use of the compounds according to the invention in this "bookshelf" geometry is particularly advantageous, since this not only leads to good dark states but also to high transmission of the bright state due to the large effective switching angle.

Furthermore, it has been found that the compounds according to the invention facilitate in FLC mixtures the field-induced generationofahomogeneous "quasi-bookshelf" geometry (Y.Sato et al., Jap. J.Appl. Phys. 28, 483 (1989)).

The invention will be illustrated by the examples which follow:

EXAMPLES

In the examples which follow, the ionophores according to the invention are used in concentrations of 1 mol %. Examples of the compounds according to the invention are the compounds V1 and V2.

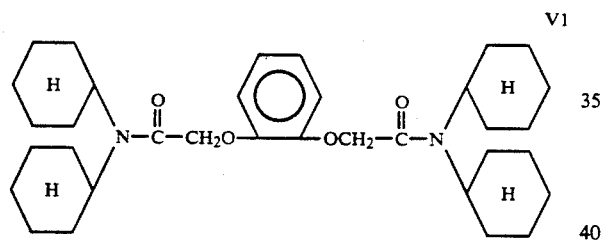

N,N,N',N'-Tetracyclohexyl-1,2-phenylenedioxydiacetamide

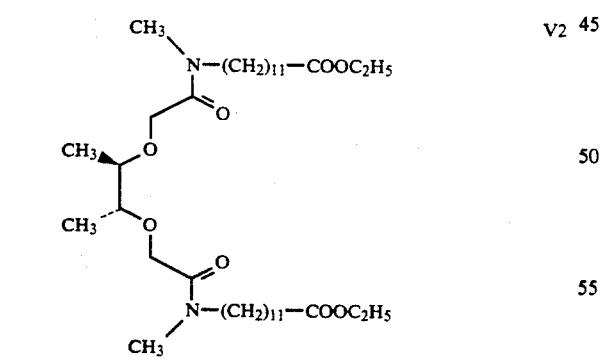

(-)-(R,R)-N,N'-[Bis(11-ethoxycarbonyl)undecyl]-N,N'-4,5-tetramethyl-3,6-dioxa-octanediamide A liquid-crystalline basic mixture containing the following eight components (in mol %) is prepared:

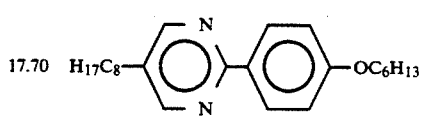
17.70

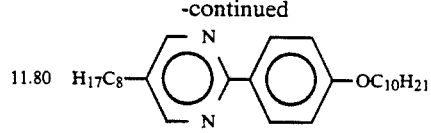
11.80

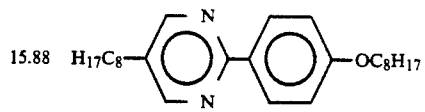
15.88

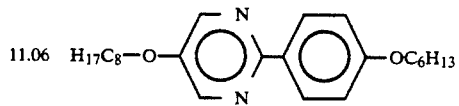
11.06

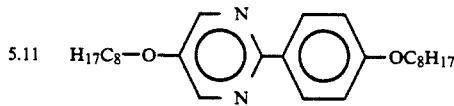
5.11

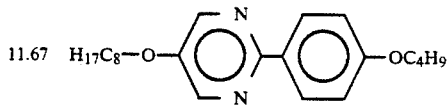
11.67

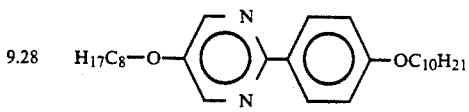
9.28

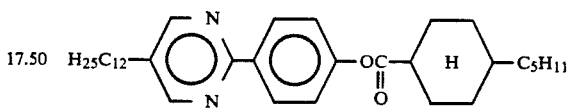
17.50

The mixture has the following phase transition:

$S_C 69\ S_A 76\ N\ 92\ I$

The following compounds are used as examples of doping substances:

Doping substances D1

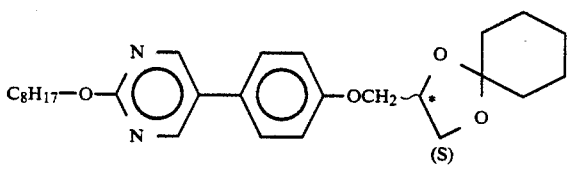

Doping substances D2

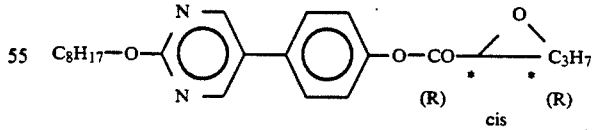

Doping substance D3

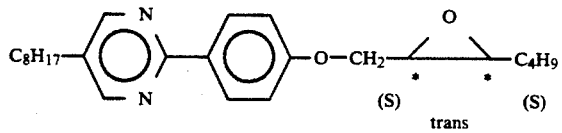

The LC mixture mentioned, the doping substances and the ionophores V1 and V2 are used to prepare the following FLC mixtures according to the invention.

EXAMPLE 1

(Comparison mixtures)

FLC comparison mixture M1 has the following composition (in mol %)

| LC basic mixture | 78.3% |
| --- | --- |
| Doping substance D1 | 4.7% |
| Doping substance D2 | 9.0% |
| Doping substance D3 | 8.0% | and the phase transition $S_C$•60 $S_A$•70 N* 79 I having a spontaneous polarization of 55 nC×cm$^{-2}$. The switching angle (2 $\Theta_{eff}$), the transmission of the bright and dark state and the optical contrast are determined. For this purpose, the measurement cell containing the FLC mixture is placed under a polarizing microscope equipped with a revolving stage. The switching angle of addressed cells can be determined by rotating the microscope stage. The transmission of the bright and dark state is measured by means of a photodiode located in the optical path of the polarizing microscope. The optical contrast is calculated from the ratio of the transmission of the bright and dark state.

The comparison mixture gives the following measured values:

| Switching angle (2 $\Theta_{eff}$) | 15° |
| --- | --- |
| Transmission (dark state) | 8% |
| Transmission (bright state) | 28% |
| Contrast | 3.5 |

EXAMPLE 2

An FLC mixture which differs from the abovementioned mixture only by containing an additional 1 mol % of the ionophore V1 gave the following measured results:

| Switching angle (2 $\Theta_{eff}$) | 24° |
| --- | --- |
| Transmission (dark state) | 0.7% |
| Transmission (bright state) | 58% |
| Contrast | 82 |

By adding the ionophore V1, the FLC mixture achieves significantly better properties: the switching angle becomes substantially larger and the contrast improves significantly.

EXAMPLE 3

An FLC mixture which differs from the comparison mixture of Example 1 only by containing 1 mol % of the ionophore V2 shows the following effective switching angle:

2 $\theta_{eff}$=21°

This means that by adding the compound according to the invention the switching angle increases by 40%.

What is claimed is:

1. A ferroelectric liquid crystal mixture composed of at least two components, which contains as one component at least one ionophore of the general formula (I)

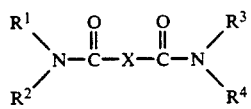

in which

R$^1$,R$^2$,R$^3$,R$^4$, independently of one another, are alkyl of 1 to 15 carbon atoms, in which one —CH$_2$— group can be replaced by —CCO—, or —CO— or one —CH$_2$— not adjacent to the N-atom by —O—, cyclohexyl, phenyl or benzyl, and X is an alkylene of 2 to 9 carbon atoms, in which one or two non-adjacent —CH$_2$— groups can be replaced by —O—, in which two adjacent —CH$_2$— groups can be replaced by 1,2-phenylene or 1,2-cyclohexylene, in which two adjacent —CH$_2$— groups can be replaced by CH(CH$_3$)—CH(CH$_3$)— and in which a hydrogen atom of a CH$_2$ group can be substituted by R$^5$ or R$^6$, in which R$^5$ is alkyl of 1 to 15 carbon atoms, R$^6$ is alkyl of 1 to 15 carbon atoms or CH$_2$—O—CH$_2$—CO—NR$^1$R$^2$.

2. A ferroelectric liquid crystal mixture as claimed in claim 1, which contains at least one ionophore of the formula (I) in which R$^1$,R$^2$,R$^3$,R$^4$, independently of one another, are alkyl of 1 to 15 carbon atoms, in which a —CH$_2$—group can be replaced by —COO—, or one —CH$_2$— not adjacent to the N-atom by —O—, cyclohexyl or phenyl, and X is an alkylene of 2 to 9 carbon atoms, in which one or two non-adjacent —CH$_2$— groups can be replaced by —O—, in which two adjacent CH$_2$ groups can be replaced by 1,2-phenylene or 1,2-cyclohexylene, in which two adjacent —CH$_2$— groups can be replaced by —CH(CH$_3$)—CH(CH$_3$)— and in which a hydrogen atom of a CH$_2$ group can be substituted by R$^5$ or R$^6$, in which R$^5$, R$^6$, independently of one another, are alkyl of 1 to 15 carbon atoms.

3. A ferroelectric liquid crystal mixture as claimed in claim 1, which contains at least one ionophore of the general formula (I) in which R$^1$,R$^2$,R$^3$,R$^4$, independently of one another, are alkyl of 1 to 15 carbon atoms, in which one —CH$_2$— group can be replaced by —COO—, or cyclohexyl, and X is an alkylene of 2 to 9 carbon atoms, in which one or two non-adjacent —CH$_2$— groups can be replaced by —O—, in which two adjacent CH$_2$ groups can be replaced by 1,2-phenylene, and in which two adjacent —CH$_2$— groups can be replaced by —CH(CH$_3$)—CH(CH$_3$)—.

4. A ferroelectric liquid crystal mixture as claimed in claim 1, which contains an ionophore of the general formula (I) in which -X- represents one of the following groups

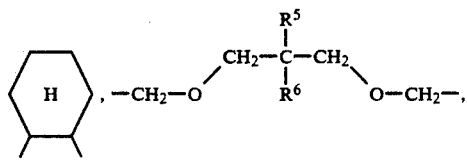

-continued

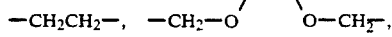
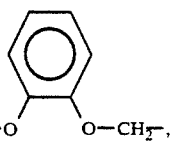

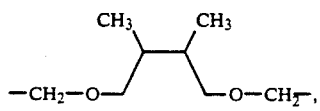

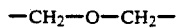

and $R^1$ to $R^6$ have the meanings mentioned in claim 1.

5. A ferroelectric liquid crystal mixture as claimed in claim 1, wherein the mixture contains 0.01 to 10 mol % of a compound of the formula (I).

6. A ferroelectric liquid crystal mixture as claimed in claim 1 wherein the mixture contains two or more different compounds of the general formula (I).

7. A liquid crystal switching and display device, comprising a ferroelectric liquid-crystalline medium, support plates, electrodes, and at least one orientation layer wherein the ferroelectric liquid-crystalline medium is a ferroelectric liquid crystal which contains at least one compound of the general formula (I) as claimed in claim 1.

8. A liquid crystal switching and display device as claimed in claim 7, wherein the switching and display device is a surface stabilized ferroelectric liquid crystal cell having an FLC cell thickness of 1 to 20 μm.

9. A ferroelectric liquid crystal switching and display device, comprising a ferroelectric liquid crystal mixture as claimed in claim 1.

10. A surface stabilized ferroelectric liquid crystal cell having a cel thickness of 1 to 10 μm and comprising a ferroelectric liquid crystal mixture as claimed in claim 1.

* * * * *

UNITED STATES PATENT AND TRADEMARK OFFICE
CERTIFICATE OF CORRECTION

PATENT NO.   : 5,167,856
DATED        : December 1, 1992
INVENTOR(S)  : Takamasa Harada et al.

It is certified that error appears in the above-identified patent and that said Letters Patent is hereby corrected as shown below:

<u>Claim 1, column 8, line 11</u>, please replace "by -CCO-" with --by -COO- --.

Signed and Sealed this

Second Day of November, 1993

Attest:

BRUCE LEHMAN

Attesting Officer     Commissioner of Patents and Trademarks